United States Patent
Sutherland et al.

(10) Patent No.: US 11,297,815 B2
(45) Date of Patent: Apr. 12, 2022

(54) AUTOMATIC ROD HOLDER

(75) Inventors: Scott Sutherland, Hood River, OR (US); David Carr, Hood River, OR (US)

(73) Assignee: BURNEWIIN INC., White Salmon, WA (US)

( * ) Notice: Subject to any disclaimer, the term of this patent is extended or adjusted under 35 U.S.C. 154(b) by 2941 days.

(21) Appl. No.: 13/374,676

(22) Filed: Jan. 6, 2012

(65) Prior Publication Data

US 2013/0174467 A1 Jul. 11, 2013

Related U.S. Application Data

(60) Provisional application No. 61/460,793, filed on Jan. 7, 2011.

(51) Int. Cl.
*A01K 97/10* (2006.01)
(52) U.S. Cl.
CPC .................... *A01K 97/10* (2013.01)
(58) Field of Classification Search
CPC ..................................... A01K 97/10
See application file for complete search history.

(56) References Cited

U.S. PATENT DOCUMENTS

| | | | | |
|---|---|---|---|---|
| 1,963,463 A * | 6/1934 | Hammer | ............... | A01K 97/10 248/515 |
| 2,682,127 A * | 6/1954 | Binder | ................... | A01K 97/10 43/21.2 |
| 2,949,269 A * | 8/1960 | Senkichiro | ............. | A01K 97/10 248/515 |
| 4,635,390 A * | 1/1987 | Walters | .................. | A01K 97/10 248/538 |
| 4,821,990 A * | 4/1989 | Porter | .................... | F16M 13/02 248/231.51 |
| 6,584,723 B2 * | 7/2003 | Elmore | .................. | A01K 97/10 248/538 |
| 2011/0225870 A1 * | 9/2011 | Carnevali | ............. | A01K 97/10 43/21.2 |

* cited by examiner

*Primary Examiner* — Richard G Davis
(74) *Attorney, Agent, or Firm* — Alleman Hall Creasman & Tuttle LLP

(57) ABSTRACT

The invention is an automatic rod holder with a frame and two opposed clamping jaws pivotally connected to the frame by parallel axes of rotation such that the clamping jaws exhibit a range of motion between a closed configuration and an open configuration, wherein the closed configuration has a longitudinal opening defined by opposing concave portions of the clamping jaws configured to retain a rod.

20 Claims, 7 Drawing Sheets

AUTOMATIC ROD HOLDER

FIELD OF THE PRESENT INVENTION

This invention relates generally to fishing accessories. More particularly, this invention relates to an improved fishing rod holder, which can be used to securely retain a rod but also quickly and easily release the rod when desired.

BACKGROUND OF THE INVENTION

Fishing rod holders generally serve to secure a fishing rod and reel combination in a position that allows the system to maintain the fishing line, the bait or lure and hook in the water without requiring the active participation of the user. Often, the fishing rod holder is designed to allow the user to quickly take over control of the rod and reel when a fish takes the hook. Despite these general goals, there are numerous types of fishing rods and reels, as well as many different fishing styles and applications. As a result, there are a wide variety of prior art fishing rod holders that employ various strategies to secure and stabilize the rod.

Conventional rod holders typically must balance the security of the mechanism that hold the rod with the difficulty of operating the rod holder to grip and release the rod. Traditionally, holders that receive the rod relatively easily do not provide a particularly robust attachment to the rod, resulting in a loose fit that does not offer much stability and is prone to accidental release. Alternatively, prior art rod holders that exhibit greater stability and security often require increased time and effort to place and withdraw the rod, which detracts from the fishing experience.

Unfortunately, as one of skill in the art will appreciate, the size and placement of the reel can differ substantially, as can the diameter of the rod, the rod grips and the size and position and presence or absence of a finger grip or trigger. Given these variations, most rod and reel combinations will not fit a given rod holder in the optimal manner described above. Further, conventional rod holders generally are not designed to adjust to varying rod and reel combinations. As a result, prior art rod holders fail to secure and stabilize most rod and reel combinations in the best manner.

Accordingly, what has been needed is an automatic rod holder that quickly and securely retains the rod while minimizing the interaction necessary from the user. What has also been needed is a rod holder that is capable of accommodating a wide variety of rod and reel combinations, while engaging the rod at the main fore and aft grips and simultaneously supporting the reel. This invention satisfies these and other needs.

SUMMARY OF THE INVENTION

The invention comprises an automatic rod holder comprising a frame and two opposed clamping jaws pivotally connected to the frame by parallel axes of rotation such that the clamping jaws exhibit a range of motion between a closed configuration and an open configuration, wherein the closed configuration has a longitudinal opening defined by opposing concave portions of the clamping jaws configured to retain a rod. Preferably, the longitudinal opening has a first diameter and wherein opposing edges of the clamping jaws are separated by a distance greater than the first diameter when in the open configuration. Also preferably, an upward force on an upper portion of the clamping jaws when in the closed configuration pivots the clamping jaws into the open configuration. Similarly, a downward force on a lower portion of the clamping jaws when in the open configuration pivots the clamping jaws into the closed configuration.

In one aspect, the lower portion and the upper portion of the clamping jaws is separated by the concave portion. In another aspect, each parallel axis is formed by a pair of aligned hinges.

In one embodiment, the rod holder further comprises a recess formed in each clamping jaw between the pair of hinges. Preferably, each recess is defined by fore and aft portions of each clamping jaw.

In another aspect, the automatic rod holder further comprises a locking mechanism that automatically engages to prevent rotation of the clamping jaws from the closed configuration to the open configuration.

In yet another aspect, the clamping jaws have over-center mechanisms. Preferably, the over-center mechanisms comprise a spring operatively connected between the frame and the clamping jaws.

In one embodiment, the clamping jaws are linked to provide synchronized motion between the open configuration and the closed configuration. Preferably, a lower portion of the clamping jaws further comprises complimentary interoperating members. Also preferably, the complimentary interoperating members comprise cooperating cams and followers.

In a further aspect, the frame also comprises a recess configured to receive a projection extending from a rod secured within the longitudinal opening when the clamping jaws are in the closed configuration.

The invention is also directed to a method for holding a fishing rod comprising the steps of providing an automatic rod holder comprising a frame and two opposed clamping jaws pivotally connected to the frame by parallel axes of rotation such that the clamping jaws exhibit a range of motion between a closed configuration and an open configuration, placing a rod between the clamping jaws, exerting a downward force on a lower portion of the clamping jaws with the rod to pivot the clamping jaws into the closed configuration, and exerting an upward force on an upper portion of the clamping jaws with the rod to pivot the clamping jaws into the open configuration.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Before describing the present invention in detail, it is to be understood that this invention is not limited to particularly exemplified materials, methods or structures as such may, of course, vary. Thus, although a number of materials and methods similar or equivalent to those described herein can be used in the practice of the present invention, the preferred materials and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

As will be appreciated from the following discussion, the disclosed invention is directed to a rod holder that engages the rod at two primary positions, the fore and aft grip regions, as these are the areas of the rod that are designed to withstand load. Further, the rod holder also accommodates an attached reel and stabilizes it in a top-oriented position while resisting longitudinal movement of the rod and reel combination. Further, the designs of this invention are able to achieve these characteristics with a wide range of rod and reel combinations that exhibit significantly different profiles and diameters.

Figure 1:
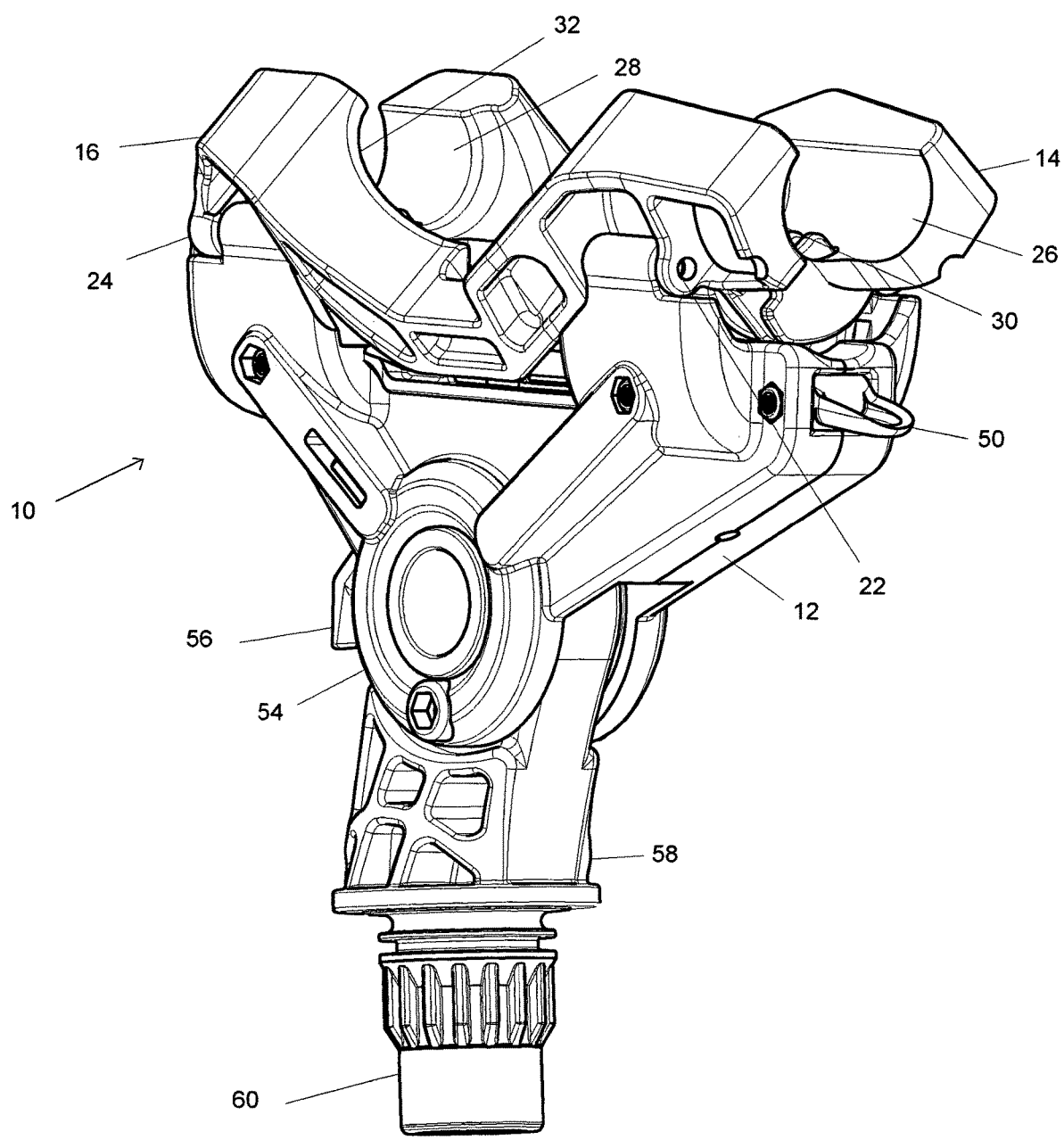
FIG. 1 is an elevational view of an automatic rod holder in the open configuration, according to the invention.
Figure 2:
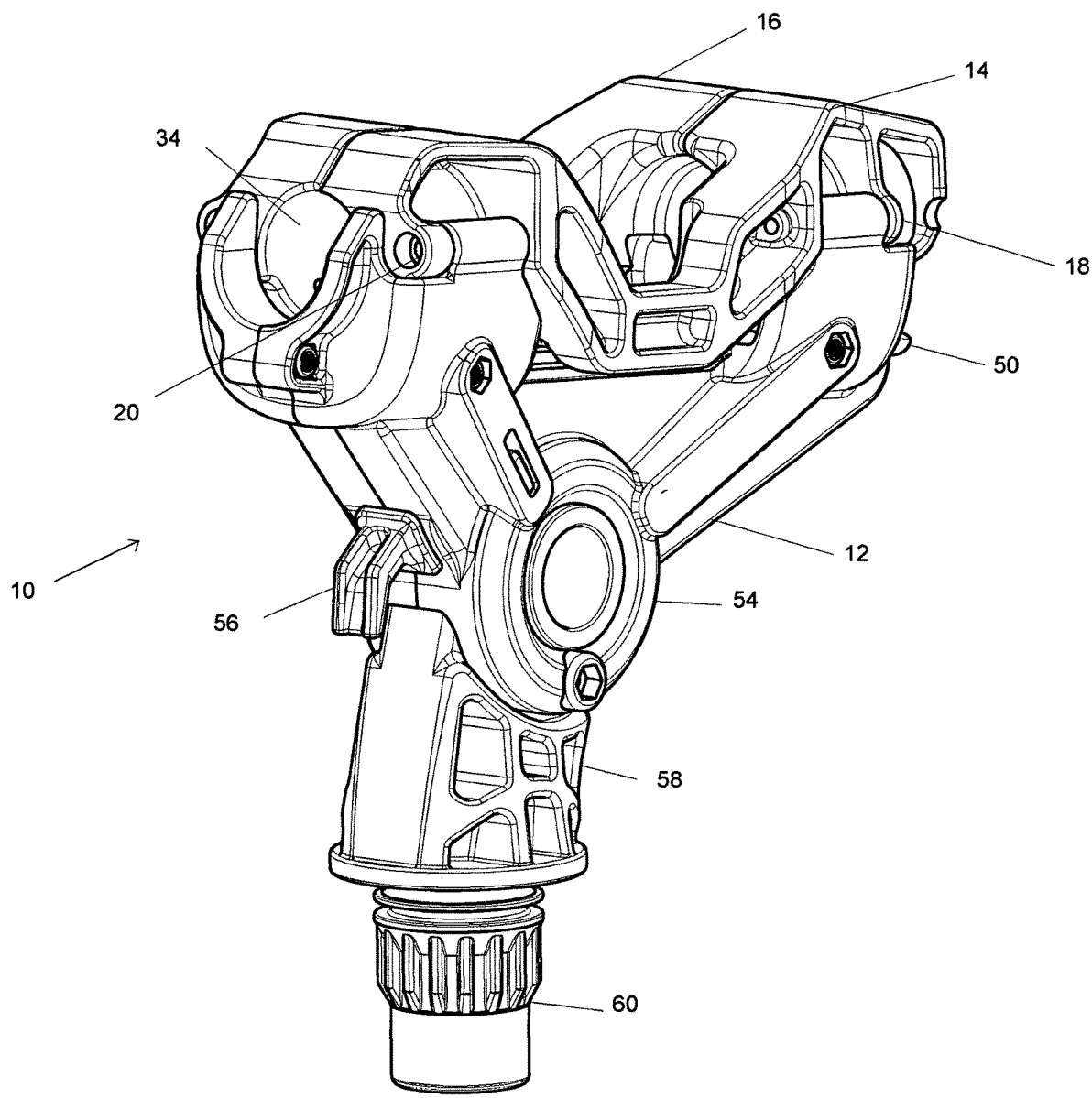
FIG. 2 is an elevational view of the automatic rod holder in the closed configuration, according to the invention.

Turning now to the figures, multiple views from varying perspectives of an embodiment of rod holder 10 in open and closed configurations will be described in detail below. FIGS. 1 and 2 are isometric views of rod holder 10 in its open and closed configurations, respectively, showing frame 12 with two, opposing clamping jaws 14 and 16. Jaws 14 and 16 are pivotally connected to frame 12 along parallel axes of rotation, formed by pairs of aligned hinges. Jaw 14 has fore and aft hinges 18 and 20, respectively, while jaw 16 has fore and aft hinges 22 and 24. The aligned hinges allow each jaw 14 and 16 to pivot through a range of motion between the closed configuration of FIG. 2 and the open configuration of FIG. 1.

Figure 3:
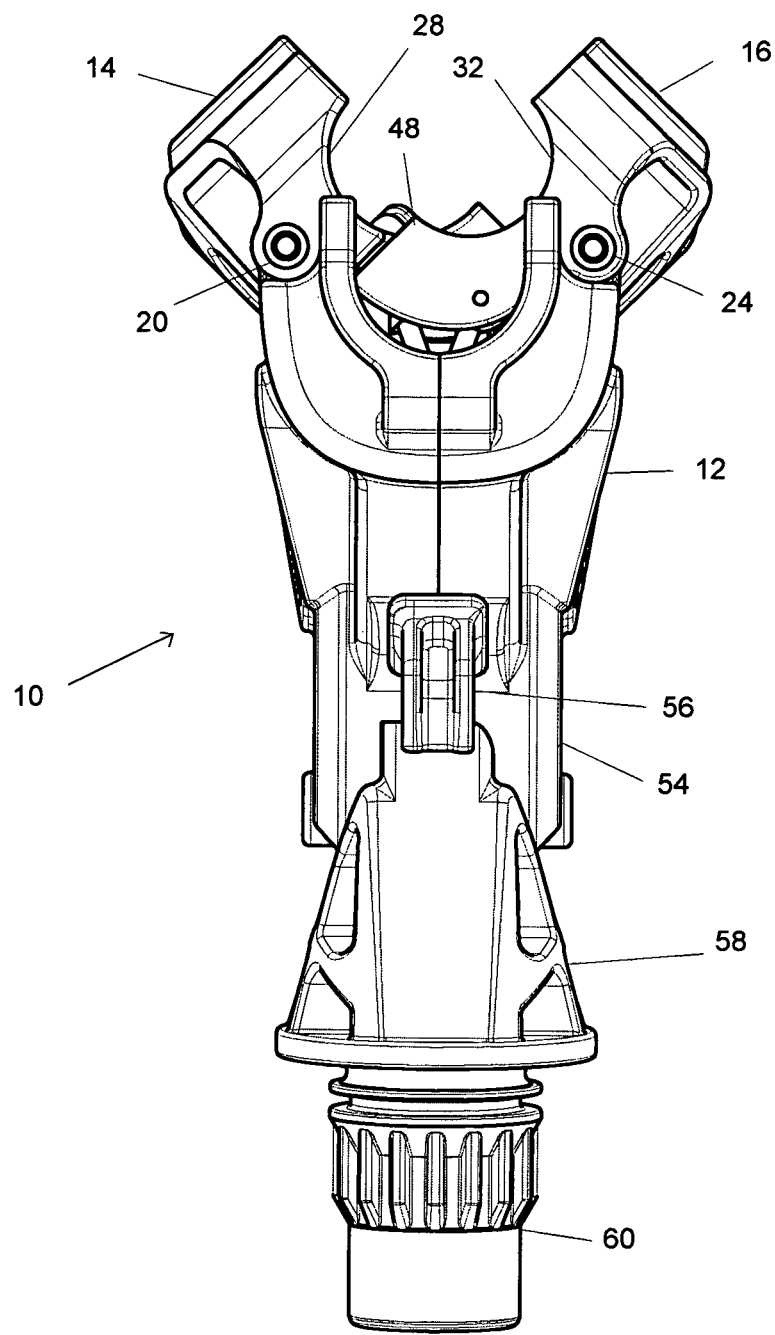
FIG. 3 is an end view of the automatic rod holder in the open configuration, according to the invention.
Figure 4:
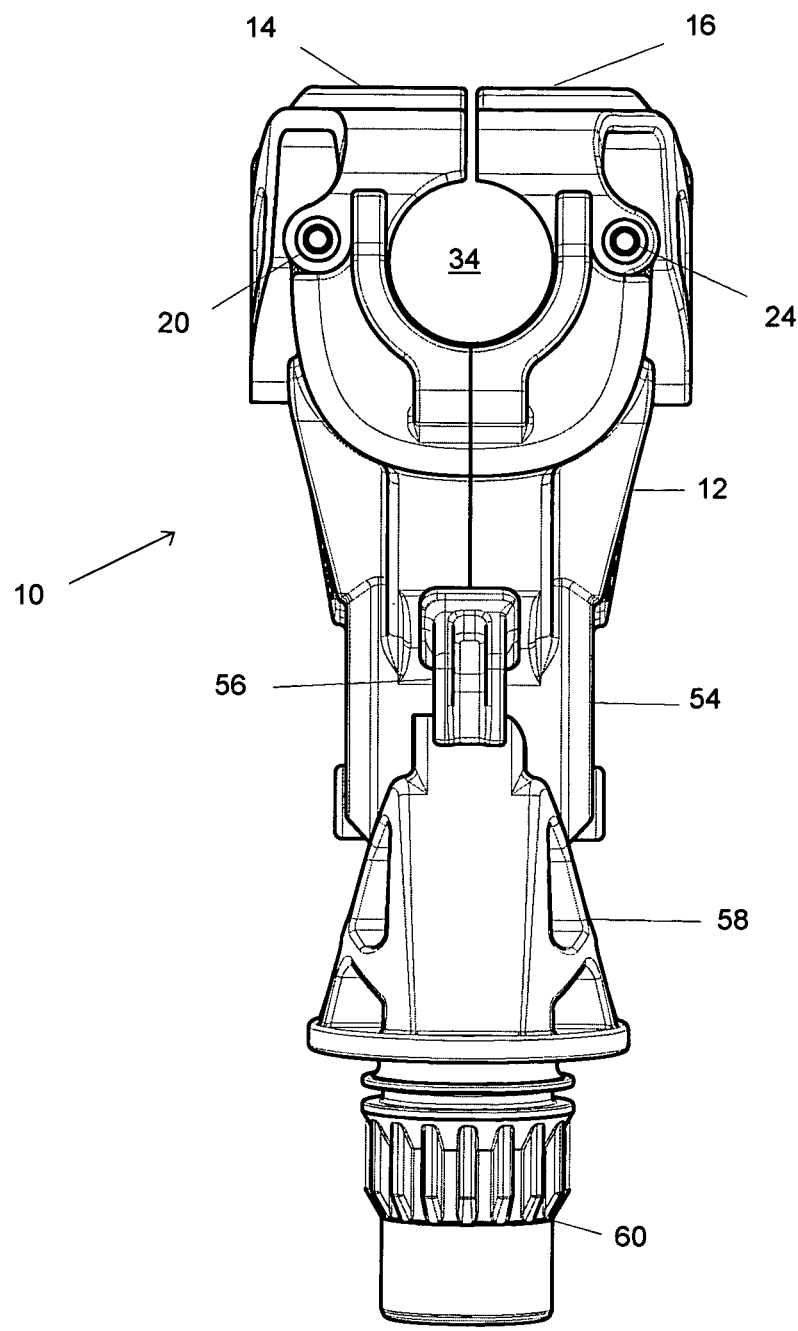
FIG. 4 is an end view of the automatic rod holder in the closed configuration, according to the invention.

As shown more clearly in the end views of FIGS. 3 and 4, for example, jaws 14 and 16 have a c-shaped profile formed by fore and aft surfaces concave surfaces 26 and 28 for jaw 14 and fore and aft concave surfaces 30 and 32 for jaw 16. Together, surfaces 26-32 define a longitudinal opening 34, best seen in FIG. 4. In this view, the parallel axes of rotation formed by hinges 18 and 22 (hinges 20 and 24 are not visible) are positioned slightly above the center of opening 34. Opening 34 is preferably sized to accommodate the diameter of rod adjacent the reel, which is approximately in the range of 26-38 mm and more typically in the range of 28-36 mm. Opening 34 should be correspondingly larger, but not so large as to create undue play.

Accordingly, longitudinal opening 34 can be configured to accept a wide range of fishing rods having varying diameters. As can be seen, the closed configuration shown in FIGS. 2 and 4, for example, is characterized by the top edges of the upper portions of jaws 14 and 16 being positioned closely enough together to restrain a rod disposed within longitudinal opening 34. As such, jaws 14 and 16 need not touch when in closed configuration, but any space between them is preferably substantially smaller than the diameter of a fishing rod. Consequently, any gap is necessarily substantially smaller than the diameter of opening 34 when in the closed configuration.

Correspondingly, in the open configuration shown in FIGS. 1 and 3, the top edges of jaws 14 and 16 are spaced apart a sufficient distance to allow the fishing rod to be removed from rod holder 10. Preferably, the space between the top edges of jaws 14 and 16 is greater than the diameter of the longitudinal opening 34 formed by the closed configuration to facilitate removal of the rod. In other embodiments, the edges of jaws 14 and 16 may be relatively closer when opened, but should still have a sufficient space to allow a rod to be removed in a direction perpendicular to the longitudinal opening 34.

As will be appreciated, the positioning of the axes of rotation causes the center of opening 34 to move perpendicularly with respect to longitudinal axis of the opening when jaws 14 and 16 pivot between open and closed. Accordingly, operation of rod holder 10 is very straightforward. When in the open configuration shown in FIG. 1, for example, placing a rod in opening 34 and applying downward force transmits that force to the bottom portions of jaw 14 and 16, causing them to pivot to the closed configuration shown in FIG. 2. Likewise, pulling up on a rod disposed within opening 34 when rod holder 10 is closed transmits an upward force to the top portions of jaws 14 and 16, causing them to pivot to the open configuration, releasing the rod.

Figure 5:
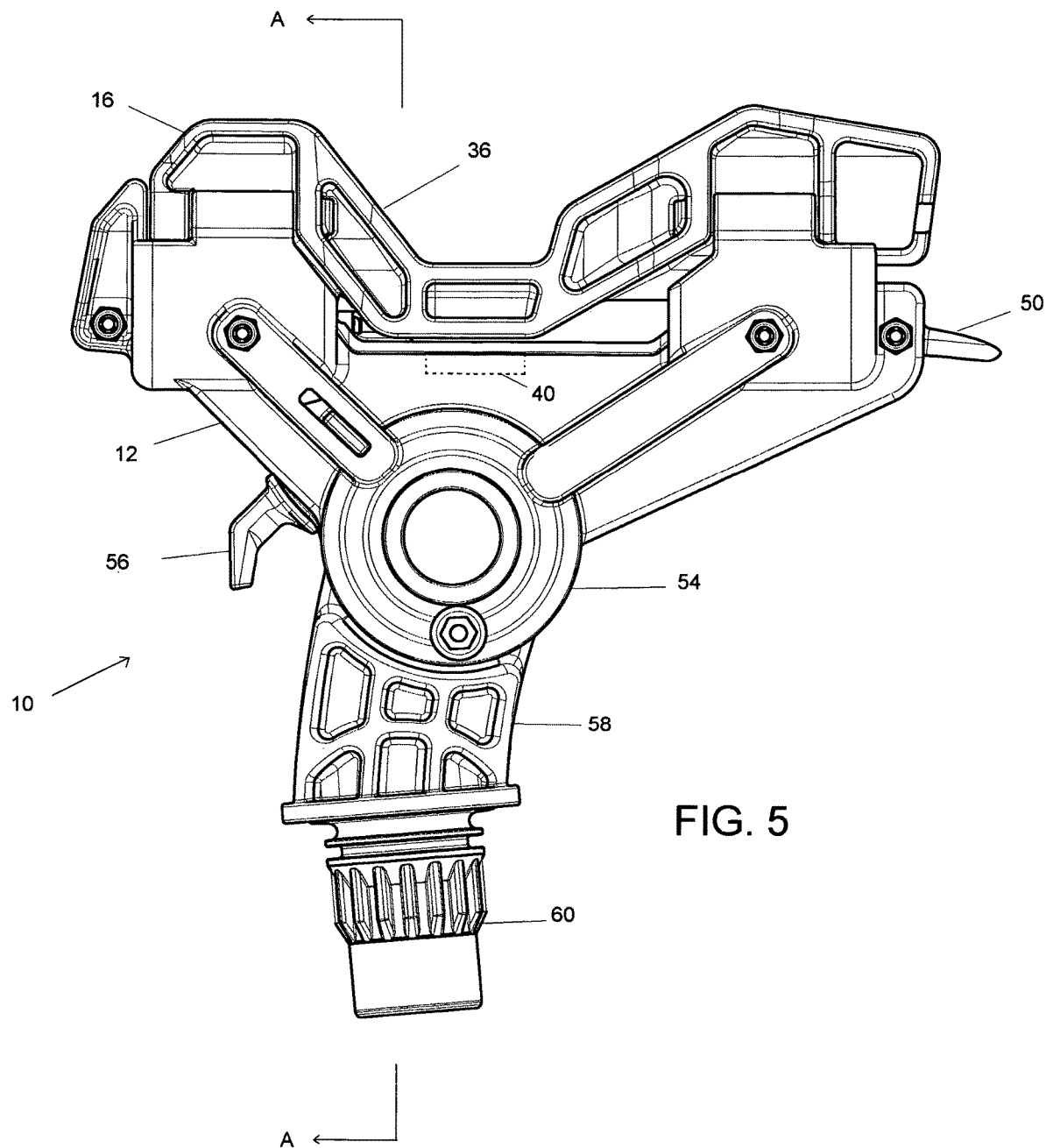
FIG. 5 is a side view of the automatic rod holder in the closed configuration, according to the invention.
Figure 6:
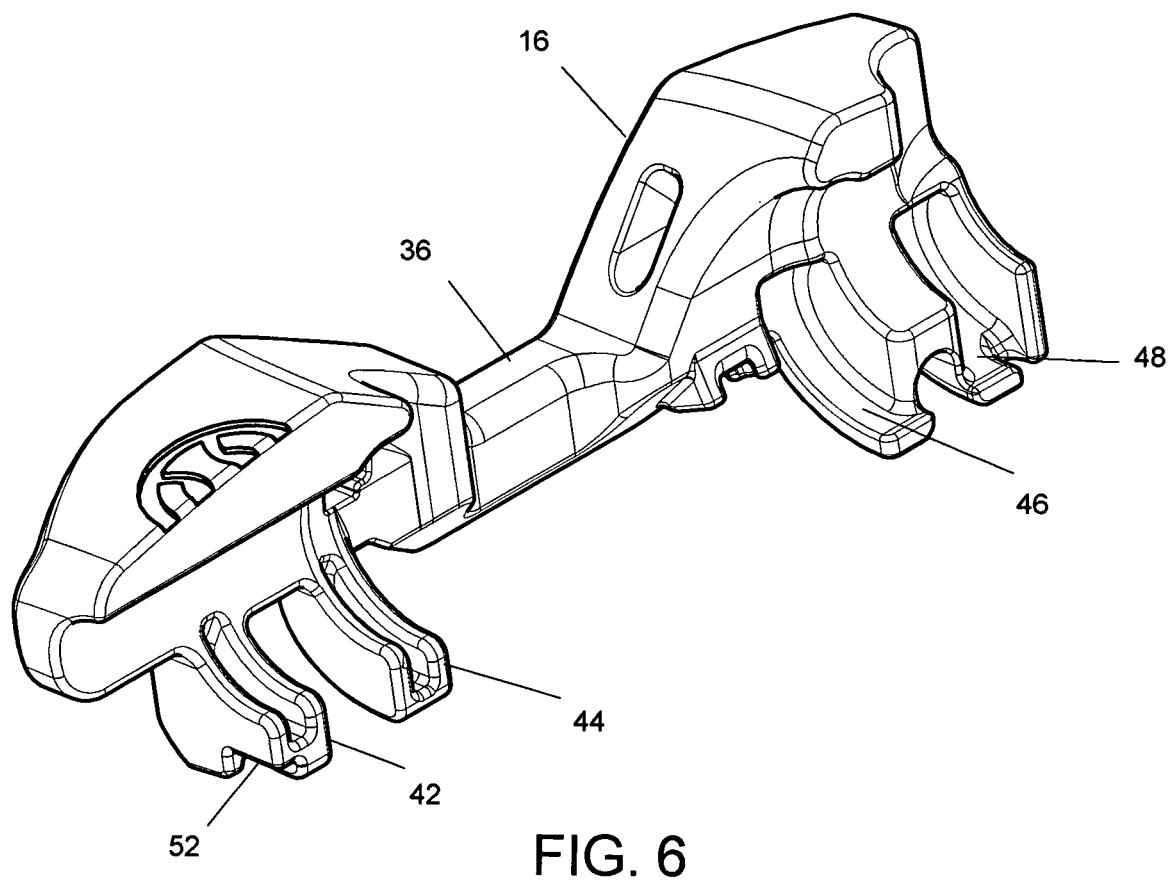
FIG. 6 is a elevational view of one jaw of the automatic rod holder, according to the invention.

FIG. 5 shows a side view of rod holder 10, showing the longitudinal profile of jaw 14. Recess 36 is configured to accommodate a reel attached to a rod disposed within opening 34. Generally, recess 36 is formed between hinges 20 and 24. Jaw 16 has a mirror configuration, so that recess 38 is formed between hinges 18 and 22. In a typical configuration, the outer circumference of a reel secured to a rod is positioned in a range between flush with the centerline of the rod diameter and flush with the outer diameter of the rod. Accordingly, recesses 36 and 38 preferably extend below the center of opening 34 when rod holder 10 is in its closed configuration to accommodate such rod and reel combinations. Similarly, FIG. 6 shows a top view of rod holder 10 that illustrates the portion of recesses 36 and 38 formed by fore and aft portions of jaws 14 and 16. Recess 36 is configured to encompass a reel attached to a rod disposed within opening 34. As a result, a rod and reel combination disposed in opening 34 will be securely restrained from travel along the longitudinal axis.

As will be appreciated, axial rotation of a rod in rod holder 10 is significantly reduced by interference between the reel and jaws 14 and 16. However, further stabilization of the rod is obtained by channel 40 formed in the top surface of frame 12 and is accessible through jaws 14 and 16. Channel 40 is configured to accept the finger grip or trigger that is formed on some rod and reel combinations. In general, any projection extending from the diameter of the rod opposing the reel can be accommodated by channel 40 to help stabilize the rod against axial rotation when the rod is retained in rod holder 10. In one aspect of the invention, a specific projection configured to fit closely within channel 40 is secured to the rod, preferably as part of a clamping apparatus used to secure the reel to the rod.

Figure 7:
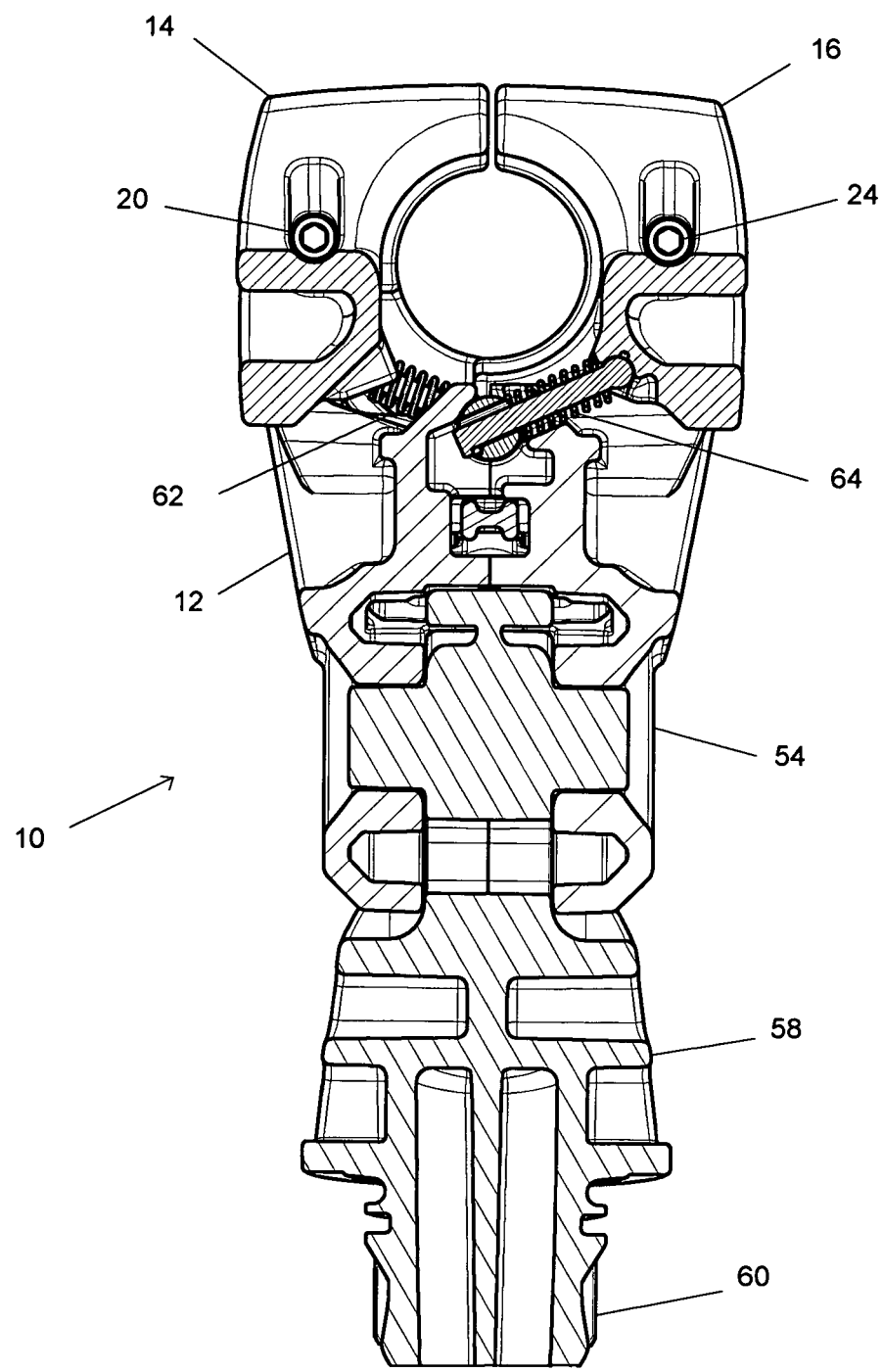
FIG. 7 is a cross section of the automatic rod holder shown in FIG. 5, taken at line A-A, according to the invention.

Preferably, rod holder 10 is configured so that jaws 14 and 16 are linked to move in concert when pivoting between the open and closed configurations. As shown in FIG. 7, the lower portion of jaw 16 has interoperating members including cams 42 and 44 at the fore region and followers 46 and 48 at the aft region. Correspondingly, the bottom portion of jaw 14 has complimentary interoperating members including followers at the fore region configured to receive cams 42 and 44 and has cams at the aft region configured to be received by slides 46 and 48. Thus, the cams of each jaw slide along the followers as the jaws pivot about the axes of rotation and keep the relative rotation of jaws 14 and 16 synchronized as they pivot between the open and closed configurations. Other suitable mechanisms can be employed so that jaws 14 and 16 interoperate, including rack and pinion systems, gear driven systems, pin and guide systems and the like.

The fore and aft positioning of the top and bottom portions of jaws 14 and 16 act to provide an inherent locking function. When a rod is positioned within holder 10 in its closed configuration, a force applied to either end of the rod will tend to create offsetting forces in the holder. For example, an upward force at the aft end of the rod will cause an upward force to be exerted against the top portion of the aft region of holder 10. However, a pivoting action created by the interaction of the rod against the aft region of the holder causes a downward force to be exerted against the fore region of the holder. As discussed above, an upward force tends to cause the jaws to rotate to the open configuration while a downward force tends to cause the jaws to rotate to the closed configuration. As a result, the simultaneous upward and downward forces created when force is applied to one end of the rod act to counteract each other, preventing rod holder 10 from assuming the open configuration. In contrast, when an upward force is applied at both ends of the rod, there is no counteracting force created at the opposing ends of rod holder 10, so jaws 14 and 16 are free to pivot and assume the open configuration to release the rod.

To augment this inherent force, a locking mechanism can be employed as desired. In the embodiment shown, lever 50 has a fore end configured to be actuated by a user of rod holder 10 and an aft end that is biased in an upward direction, preferably by a spring or similar structure. The aft end of lever 50 is positioned to fit within notch 52 of cam 42 when jaw 16 is in the closed configuration. Jaw 14 has a similar notch in the corresponding follower (not shown). Since lever 50 is biased in the upward direction, whenever the jaws assume the closed configuration, the biasing force automatically causes the aft end of lever 50 to engage the notches and prevent rotational movement of jaws 14 and 16. When the user wishes to withdraw a rod from rod holder 10, simply lifting the fore end of lever 50 disengages the aft end from the notches, allowing jaws 14 and 16 to rotate into the opened configuration. The positioning of lever 50 adjacent the aft end of frame 12 allows for easy actuation by the user when gripping the rod for removal.

In this embodiment, frame 12 features a rotating joint 54 having a plurality of indexed rotational positions. Trigger 56 adjacent the aft portion of frame 12 actuates a spring-loaded locking member that engages recesses in the base 58 of rotating joint 54. As can be seen, trigger 56 is mechanically aligned in the plane of rotation, so that trigger 56 can be ergonomically placed to allow actuation while the user's hands are positioned on a rod disposed in opening 34 of rod holder 10. Further, the motion of trigger is aligned with the locking member, which travels along a substantially radial path with respect to the axle of rotating joint 54. Trigger 56 operates to adjust the orientation of rotating joint 54 between a plurality of desired angles, such as a flat running angle and a 45° fighting angle. Further details regarding the rotating joint shown in this embodiment can be found in co-pending U.S. patent application Ser. No. 11/824,970, filed Jul. 2, 2007, which is hereby incorporated by reference in its entirety. As will be appreciated, other suitable rotating joints or no joint at all can be employed as desired.

A further aspect of this embodiment is base 58 of rotating joint 54, which features a splined insert member 60 configured to fit within and be secured by a mount attached to a suitable surface. Details regarding suitable universal mounting systems using such splined inserts can be found in co-pending U.S. patent application Ser. Nos. 11/824,969 and 11/824,992, both filed Jul. 2, 2007, which are hereby incorporated by reference in their entirety. Other systems and mechanism for securing frame 12 to a fixed structure can also be employed as desired.

The rotation of jaws 14 and 16 of rod holder 10 during the transition between open and closed configurations is facilitated by the use of an over-center mechanism that biases the movement of the jaws to the ends of the range of motion. Specifically, as shown in the cross-sectional view shown in FIG. 7, springs 62 and 64 are operatively connected, preferably by pivoting attachments, in compression between frame 12 and jaws 14 and 16, respectively. As jaw 14 begins to pivot along hinge 20 in the range of travel between the shown closed configuration and the open configuration, spring 62 will be progressively compressed to a greater degree. At an inflection point, the "center" of the over-center mechanism, approximately halfway through the range of travel, spring 62 then progressively extends as rotation of jaw 14 continues to the open configuration. Spring 64 operates in a similar manner on jaw 16. Thus, the action of springs 62 and 64 urges the jaws 14 and 16 to either the closed or open configuration depending upon their position within their range of motion. As discussed above, this embodiment employs an inflection point approximately halfway between the open and closed states, but other relative positions of the inflection point can be employed as desired.

From the above description, it will be appreciated that the rod holder designs disclosed herein provide a quick and reliable means for securing the rod and require minimal user interaction. For example, when placing the rod into the holder 10, the user need not even touch the holder. Rather, the user simply places the rod longitudinally between jaws 14 and 16 and presses downward. Typically, the user will have one hand at a fore position of the rod and the other hand aft, so that an even downward pressure can be transmitted to rod holder 10 at both fore and aft locations. However, a similar result can be achieved with either one or both hands gripping the rod adjacent the reel at an area between the fore and aft ends of holder 10. The interaction of the rod with clamping jaws 14 and 16 automatically causes them to rotate into the closed configuration. Further, lever 50 automatically locks the jaws in the closed configuration. To remove the rod, the user merely pulls upward on lever 50 while exerting an upward force on the rod. Typically, the fore hand will actuate the lever 50 while pulling upwards on the rod in concert with the aft hand also pulling upward on the rod. However, as above, a similar result could be achieved by using one or both hands to pull upward in an area between the fore and aft ends of holder 10 and adjacent the reel. In embodiments that do not have a positive locking mechanism, the user need not touch holder directly when removing the rod.

Described herein are presently preferred embodiments, however, one skilled in the art that pertains to the present invention will understand that there are equivalent alternative embodiments. For example, the rod holders of the invention are not limited to uses on a boat, but can be employed with any other vehicle or structure that presents a suitable mounting area. Furthermore, the invention is not limited to fishing as the mechanisms disclosed herein can be adapted to secure any substantially elongated member. As such, changes and modifications are properly, equitably, and intended to be, within the full range of this disclosure.

What is claimed is:

1. An automatic rod holder comprising a frame and two opposed clamping jaws pivotally connected to the frame by parallel axes of rotation such that the clamping jaws exhibit a range of motion between a closed configuration and an open configuration, and further comprising a locking mechanism that automatically engages to prevent rotation of the clamping jaws from the closed configuration to the open configuration, wherein the closed configuration has a longitudinal opening defined by opposing concave portions of the clamping jaws configured to retain a rod.

2. The automatic rod holder of claim 1, wherein the longitudinal opening has a first diameter and wherein opposing edges of the clamping jaws are separated by a distance greater than the first diameter when in the open configuration.

3. The automatic rod holder of claim 1, wherein an upward force on an upper portion of the clamping jaws when in the closed configuration pivots the clamping jaws into the open configuration.

4. The automatic rod holder of claim 3, wherein a downward force on a lower portion of the clamping jaws when in the open configuration pivots the clamping jaws into the closed configuration.

5. The automatic rod holder of claim 4, wherein the lower portion and the upper portion of the clamping jaws are separated by the opposing concave portions.

6. The automatic rod holder of claim 1, wherein each parallel axis is formed by a pair of aligned hinges.

7. The automatic rod holder of claim 6, wherein the rod holder further comprises a recess formed in each clamping jaw between the pair of aligned hinges.

8. The automatic rod holder of claim 7, wherein each recess is defined by fore and aft portions of each clamping jaw.

9. The automatic rod holder of claim 1, wherein the clamping jaws comprise over-center mechanisms.

10. The automatic rod holder of claim 9, wherein the over-center mechanisms comprise a spring operatively connected between the frame and the clamping jaws.

11. The automatic rod holder of claim 1, wherein the clamping jaws are linked to provide synchronized motion between the open configuration and the closed configuration.

12. The automatic rod holder of claim 11, wherein a lower portion of the clamping jaws further comprises complimentary interoperating members.

13. The automatic rod holder of claim 12, wherein the complimentary interoperating members comprise cooperating cams and followers.

14. The automatic rod holder of claim 1, wherein the frame also comprises a recess configured to receive a projection extending from the rod secured within the longitudinal opening when the clamping jaws are in the closed configuration.

15. A method for holding a fishing rod comprising the steps of:
   a) providing an automatic rod holder comprising a frame and two opposed clamping jaws pivotally connected to the frame by parallel axes of rotation such that the clamping jaws exhibit a range of motion between a closed configuration and an open configuration;
   b) placing a rod between the clamping jaws, exerting a downward force on a lower portion of the clamping jaws with the rod to pivot the clamping jaws into the closed configuration to secure the rod, such that a projection extending from the rod is received by a recess of the frame of the automatic rod holder; and
   c) exerting an upward force on an upper portion of the clamping jaws with the rod to pivot the clamping jaws into the open configuration to release the rod.

16. The method of claim 15, wherein each parallel axis is formed by a pair of aligned hinges, and the automatic rod holder further comprises a recess formed in each clamping jaw between the pair of aligned hinges.

17. The method of claim 16, wherein each recess is defined by fore and aft portions of each clamping jaw.

18. The method of claim 15, wherein the two opposed clamping jaws comprise over-center mechanisms.

19. An automatic rod holder comprising a frame and two opposed clamping jaws pivotally connected to the frame by parallel axes of rotation such that the clamping jaws exhibit a range of motion between a closed configuration and an open configuration, wherein the closed configuration has a longitudinal opening defined by opposing concave portions of the clamping jaws configured to retain a rod, and wherein the two opposed clamping jaws comprise over-center mechanisms.

20. The automatic rod holder of claim 19, wherein the over-center mechanisms comprise a spring operatively connected between the frame and the clamping jaws.

* * * * *